United States Patent [19]
Kowalski

[11] Patent Number: 5,381,452
[45] Date of Patent: Jan. 10, 1995

[54] SECURE COUNTING METHOD FOR A BINARY ELECTRONIC COUNTER

[75] Inventor: Jacek Kowalski, Trets, France

[73] Assignee: Gemplus Card International, Gemenos, France

[21] Appl. No.: 12,103

[22] Filed: Jan. 29, 1993

[30] Foreign Application Priority Data

Jan. 30, 1992 [FR] France ................................ 92 01002

[51] Int. Cl.[6] ......................... G11C 16/00; G06M 3/12
[52] U.S. Cl. ........................................ 377/26; 377/28; 377/49; 365/236; 395/575
[58] Field of Search ................... 377/24.1, 26, 28, 49; 365/236; 364/561; 395/575

[56] References Cited

U.S. PATENT DOCUMENTS

| | | | |
|---|---|---|---|
| 4,559,637 | 12/1985 | Weber | 377/24.1 |
| 4,638,457 | 1/1987 | Schrenk | 377/24.1 |
| 4,803,646 | 2/1989 | Burke et al. | 377/24.1 |
| 4,803,707 | 2/1989 | Cordan | 377/24.1 |
| 4,827,450 | 5/1989 | Kowalski | 365/185 |
| 4,860,228 | 8/1989 | Carroll | 377/24.1 |
| 4,868,489 | 9/1989 | Kowalski | 324/680 |
| 4,881,199 | 11/1989 | Kowalski | 365/189.01 |
| 4,890,187 | 12/1989 | Tailliet et al. | 361/111 |
| 4,896,298 | 1/1990 | Kowalski | 365/189.01 |
| 4,916,333 | 4/1990 | Kowalski | 307/296.5 |
| 5,001,332 | 3/1991 | Schrenk | 335/492 |
| 5,003,371 | 3/1991 | Tailliet et al. | 257/665 |
| 5,022,001 | 6/1991 | Kowalski et al. | 365/185 |
| 5,060,198 | 10/1991 | Kowalski | 365/201 |
| 5,060,261 | 10/1991 | Avenier et al. | 380/3 |
| 5,097,146 | 3/1992 | Kowalski et al. | 307/350 |

FOREIGN PATENT DOCUMENTS 0321727 6/1989 European Pat. Off.

OTHER PUBLICATIONS

Article entitled "Millions Reliably Counted and Stored", Siemens Components XXIV (1989) No. 1.

Primary Examiner—John S. Heyman
Attorney, Agent, or Firm—Nilles & Nilles

[57] ABSTRACT

The disclosure relates to counters that require the counting to be done under conditions of high security. In such a counter, starting from a number represented by a certain number of bits, the stages of the counter are successively forced, one after the other, to represent the final number in an order such that at no instant do the contents of the counter represent a number smaller than the initial number. A particular structure is used to count very big numbers while, when the technology is of the EEPROM type. This prevents the stage that changes its state most frequently from being subjected to action more than is physically permitted by the technology used. The disclosed method makes it possible, in chip cards, to prevent the diminishing of memorized values representing substantial values which are, for example, monetary values.

16 Claims, 2 Drawing Sheets

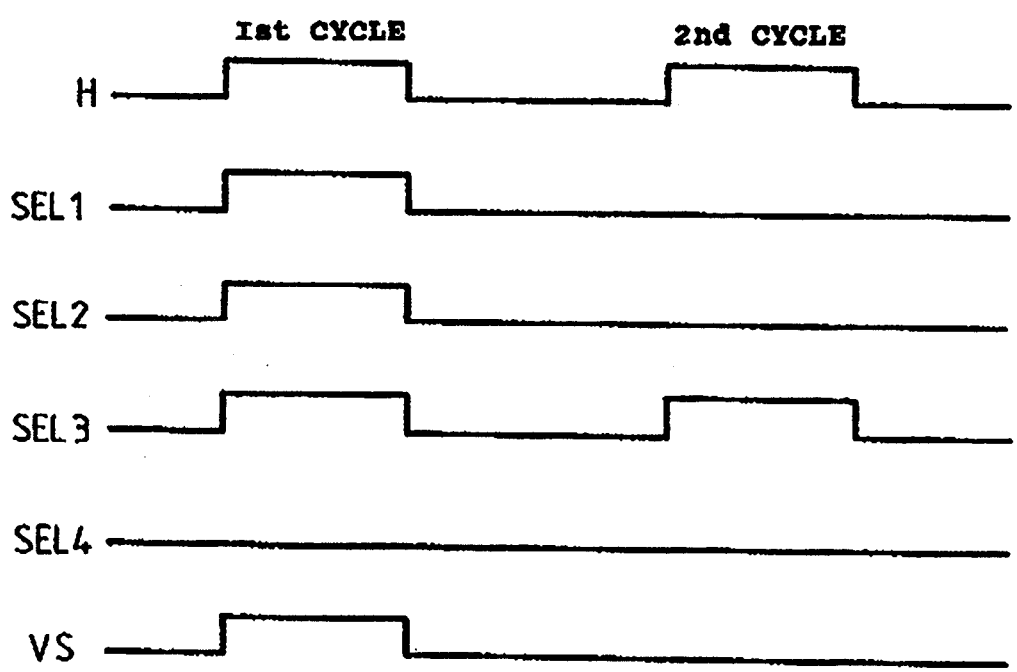

5,381,452

SECURE COUNTING METHOD FOR A BINARY ELECTRONIC COUNTER

BACKGROUND OF THE INVENTION

1. Field of the Invention

The present invention relates to methods that can be used to count numbers in ascending order in a binary counter under conditions of total security, i.e., without its being possible for a fraudulent individual to disturb the counting in a manner that is favourable to a fraudulent action.

2. Description of the Prior Art

Binary counters are used in large numbers in electronic logic systems for a variety of purposes. In certain cases, it is quite important that the value of the number thus memorized in this counter should be capable of being modified solely through the normal working of the device and not through any external event such as, for example, action by a fraudulent individual or an unwanted operation of the system. However, total security is not always necessary, and it is often far more important to prevent the counter from counting backwards when an excessive degree of forward movement by this counter would only bring about limited disadvantages. For example, there is the particular case of counters that memorize external events in a memory card known as a chip card. These external events may be, for example, the consumption of telephone units or the withdrawal of money from an automatic cash dispenser. It is quite clear that if a fraudulent individual can turn the counter back, he will be able to make excessive use of the card whereas if, on the contrary, all that his action does is to make the counter move forward, it will be of no value to him.

For small numbers, it is of course possible to use a system of the type using memories with fuses, a system that is, by its very essence, irreversible. However, if the number to be counted is a fairly big one, this system proves to be both excessively bulky and very costly.

SUMMARY OF THE INVENTION

To resolve this problem, the invention proposes a secure counting method for a binary electronic counter comprising a set of binary stages enabling the representation of an integer wherein, chiefly, to increment this binary counter from a first number to a second number greater that this first number, at least the stages whose contents have to change are forced into their final state, in an order such that at no instant do the contents of the counter represent a number smaller than the first number.

BRIEF DESCRIPTION OF THE DRAWINGS

Other features and advantages of the invention will appear clearly from the following description, given by way of a non-restrictive example and made with reference to the appended figures, of which:

FIG. 4 shows a graph of certain signals in the diagram of FIG. 3.

MORE DETAILED DESCRIPTION

Figure 1:
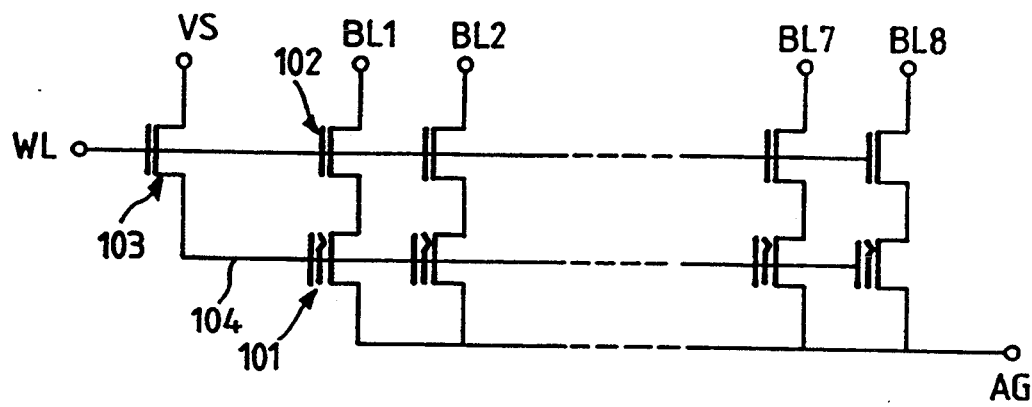
FIG. 1 is a diagram of a known EEPROM type register that enables the invention to be implemented.

The counting method according to the invention uses a binary register in which ones or zeros can be recorded permanently, so that they remain memorized even when the operating voltages needed for the circuit are absent. Furthermore, these binary digits can be erased and then re-recorded, when the device is under voltage of course. A register such as this is made essentially according to a so-called EEPROM technique which is well known to those skilled in the art, but other equivalent techniques could be used.

Using the example of an eight-stage counter, hence one that is capable of counting in binary mode up to 256, a demonstration shall be given of how, according to the invention, this counter can be made to go forward by one unit in a secure manner.

Let it be assumed, for example, that the counter contains the decimal number 155, namely in binary mode:

$$11011001 \qquad (1)$$

In the prior art, the register is wired as a counter proper, i.e. the introduction of an additional one is done on the first stage, and the stages are wired so as to make the successive carry-over operations, corresponding to the overflows at each stage, go forward step by step. Under these conditions, an external action, for example a cut in the power supply or a parasitic phenomenon, may disturb the mechanism and the counter may then return to a state corresponding to a smaller number then the one from which it has started.

To make the state of the counter go from 155 to 156 for example, in this prior art system, an additional one is introduced into the first stage, which goes to zero and leads to a carry-over operation to the second stage which itself goes to zero, causing a carry-over operation to the third stage which goes to one. The operation stops there, and the state of the counter then corresponds to 156 in decimal notation.

If, for any reason whatsoever, such as fraudulent activity or parasitical phenomena, the carry-over does not occur between the first stage and the second stage, then the register, at the end, will contain the number 154 in decimal notation and the counter will therefore have regressed with respect to the starting figure.

To prevent this, according to the invention, the register itself is not wired as a counter but is used as a simple memory, the stages of which are forced to their states. This operation is done from a logic circuit that is separate from the register and works so that the successive operations for forcing the stages of the stages of the register are done in such a way that the binary numbers corresponding to each enforcing operation go through values that are greater than the value of the number memorized at the outset, to arrive at the value of the finally desired number.

In this way, therefore, in this example, the operation starts with a search for the first zero that occurs from the left (here as all through this text, the most significant bit will be the one to the right in the formulae). Then, a one is written in the place of this zero in the corresponding bit. The state of the zero then becomes:

$$11111001 \qquad (2)$$

which corresponds to the decimal number 159.

A zero is then written on all the bits to the left of the one that has just gone to one. The state of the register is then:

00111001                    (3)

which truly corresponds to the decimal number 156 which is the one desired.

The system has thus gone from the number 155 to the number 156 by the incrementing of the counter by one unit, while at the same time going through the intermediate number 159 which is higher than the starting number 155, which is the desired result. It will be noted, besides, that the passing to zero of the two bits furthest to the left, which has been described as occurring simultaneously, could occur in any order since, at this time, the system would be placed in intermediate states that are always greater than 155.

This method extends also to incrementation, in just one stroke, by a number of units greater than one.

As an example, we shall describe a way to go from a decimal value 154 to a decimal value 179 without going through the decimal values below 154.

The number 154 is written as follows in binary notation:

01011001                    (4)

The decimal number 179, for its part, is written as follows:

11001101                    (5)

According to the invention, the procedure starts first of all with determining which is the first stage, furthest to the right, that will go from a zero to a one between the values 154 and 179. This first stage is the sixth from the left.

The procedure therefore starts by with the forcing of this sixth stage to one, giving the binary number:

01011101                    (6)

This binary number corresponds to the decimal number 186.

Then, the five bits furthest to the left, hence located before the sixth bit which has just been set at one, are reset at zero, giving the binary number:

00000101                    (7)

This binary number corresponds to the decimal number 160, which is therefore far greater than 154.

The procedure ends with the writing of a one on the first, second and fifth bits, to reach the binary number seen further above in the formula (5).

Here too, therefore, we have obtained the desired result of going from 154 to 179, without going through an intermediate value lower than 154. It will furthermore be noted that 5 writing operations are enough to add 15 units. This is particularly useful if an EEPROM technology is used for the counting register since it is known that the number of re-recordings in the cells obtained according to a technology such as this is not unlimited, although it is big enough for the uses to which it is commonly put.

The above examples have been described in terms of forward logic, but it is also possible to use a reverse logic where the zeros are replaced by ones and vice versa. The essential point is that at no time in the process should the contents of the counter-forming register be in a logic state corresponding to a number smaller than the starting number.

In practice, the way in which the individual cells of the register are programmed will depend essentially on the physical embodiment of this register. Indeed, depending on the technologies used, it is not always possible to achieve individual control over each cell in one direction or the other.

Taking, for example, an 8-bit register made with an EEPROM technology that is standard in the art, as shown in FIG. 1, this register comprises, for each cell dedicated to one bit, a memorizing transistor 101 series-connected with a reading transistor 102. This transistor 102 is connected to an individual imput BL1, and the memorizing transistor 101 is connected to a line AG common to all the memorizing transistors. The gates of the transistors 102 are connected to a common reading line WL. The gates of the transistors 101 are connected to a common line 104, which is supplied from an input VS by means of a reading transistor 103, the gate of which is itself connected to WL.

In this known structure, it is not possible to erase a single separate cell, and it becomes necessary to erase them all together. According to the notations and the standard usage, this erasure corresponds to the recording of a one in all the cells. To this end, the following voltages must be applied:

WL=Vpp (programming voltage)
Vs=Vpp
AG=0 (ground)
BL1 to BL8=0 or floating.

It is possible, on the contrary, to program each cell separately. According to the notations and the standard usage, this programming corresponds to the recording of a zero in the cell. To program, for example, the first cell, corresponding to the transistors 101 and 102, the following voltages must be applied:

WL=Vpp
Vs=0
AG=floating
BL1=Vpp.
BL2 to BL8=0 or floating.

Then, again taking up the first example, where it is sought to make the contents of the register go forward by one, starting from the number 155, the operation starts with making all the cells go to one by the application of the voltages:

VS=Vpp
WL=Vpp
AG=0

It is noted that all the cells go through one. This actually adds a step to the flow chart described further above. However, as provided for by the invention, in this step the counter register returns to a state greater than the starting state.

The process continues then with the reprogramming, at zero, of all the bits that were at zero before the erasure of the counter (the erasure corresponds to the passing to one as seen further above), except of course the bit that has to go to one from zero, namely the third bit from the left. For this purpose, the following voltages are applied:

Vs=0
WL=Vpp
AG=floating
BL6=BL7=Vpp
BL1 to BL5 and BL8=0 or floating.

We are then again in the state corresponding to the number expressed in the formula (2).

Preferably, these two steps will form part of the same programming cycle, corresponding to an erasure/reading operation followed by a reprogramming operation, as is standard in EEPROM technology. Naturally, on each bit line in the physical assembly used, there will be positioned a flip-flop that will enable the memorizing of the word which is read at the start, in order to carry out adequate re-recordings as a function of the logic used.

In the following cycle, zeros will be written on all the bits to the left of the bit that has been addressed, the third in the example, by the application of the voltages:

$V_s = 0$
$WL = V_{pp}$
$AG = $ floating
$BL1 = BL2 = V_{pp}$
$BL3$ to $BL8 = 0$ or floating.

With this recording cycle, we actually return to the binary number corresponding to the formula (3) which is the one desired.

It is furthermore observed that, in this physical embodiment, it is possible to slightly simplify the flow chart by bringing together the recording of the zeros into a single operation. Indeed, as has been seen, it is not possible to record a single one in the third stage, and it is necessary to make all the stages go to one, and then re-record the zeros to the right of the addressed stage. The simplification will then consist in simultaneously recording the necessary zeros to the left in the same phase in which the zeros are recorded to the right.

The use of this method however raises a problem with certain technologies, notably the one described relating to an EEPROM type memory. Indeed, in considering for example the starting state and the end state given by the formulae (1) and (3) when an increase has been made in the contents of the counter by one unit, it is observed that these two states correspond to the two successive states of an ordinary counter in a normal counter (using natural logic) where the stage furthest to the left, corresponding to the least significant bit, changes its state whenever the counter is incremented by one unit. This means that a writing/erasing operation is done each time. Should the counter be formed by a 16-bit register, corresponding for example by a 16-bit register, corresponding for example to two standard 8-bit registers connected in series, then this 16-bit register can count up to a maximum of $2^{16} = 65536$, which corresponds to as many writing/erasing operations of the first cell of the counter. Now, the number of times in which it is possible to carry out a writing/erasing operation such as this in a standard EEPROM type cell is not unlimited. It is generally considered that it is precisely in the the region of this number 65000 that the cell will have so deteriorated that it is no longer possible to continue to use it.

To have a register that enables secure counting and covers bigger numbers, the invention therefore proposes the use of a register comprising more than 16 stages in series, in trading off a part of the capacity of this register for physically effective possibilities of recording, through the use of the structure described here below.

Figure 2:
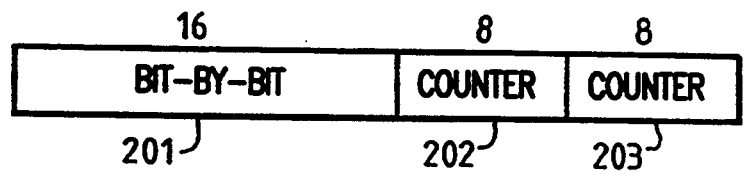
FIG. 2 shows the structure of a counter according to the invention.

Referring to FIG. 2, the register according to the invention comprises a first part 201 comprising 16 stages which may possibly be formed by two sub-parts of 8 stages each, and then two other parts 202 and 203, each comprising 8 stages.

The two parts 202 and 203 are each used as a natural binary counter in which the first stage trips as and when the counter is incremented. These two counters are series-connected and therefore make it possible, as seen further above, to count up to a number equal to 65536 which corresponds both to the maximum number of the two series-connected counters and to the physically acceptable number of writing/erasing operations for the first cell of the counter 202.

To make it possible to go further, the first part 201 is used as a bit-by-bit counter, i.e. each bit corresponds to a digit one which is written only once. Hence, the counter could count at most up to 16, when the 16 stages are full. In this way, at each bit-by-bit incrementation of this counter, there is only one stage that undergoes a writing/erasure cycle, the others undergoing no cycles and not consuming, "unnecessarily" so to speak, any writing/erasure capacities.

In fact, in the EEPROM technology used by way of an example, it is not possible to write ones separately, as has been seen further above, but rather, all the ones have to be recorded in one stroke in all the stages, and then the zeros can be written separately in each stage. In fact, this is of no importance since it is indeed possible to write ones at the outset and then, successively, zeros in each stage by using a reverse logic where the zero in each stage will actually correspond to an additional unit of incrementation.

When this bit-by-bit counter 201 is entirely filled, then the counter 202 is incremented by one unit according to the method of the invention described further above, and then, when this counter 202 is full, the counter 203 is incremented by one unit etc. until the set formed by the two counters 202 and 203 contains the number 65536.

To count ones whereas zeros are written it is enough, for example, to place an inverter if the operation is done at the level of a wired logic circuit, or to use an adequate instruction in the programming of the logic system, a microprocessor for example, which enables the programming of the stages of the counters and the reading of the states thus memorized.

In this structure, the recorded number is equal to the number to be recorded in the two counters 202/203 used as an ordinary counter, this number being multiplied by 16, plus the number of units recorded in the bit-by-bit counter 201.

For example, let us take the number defined by the following binary formula:

$$0000111111111111\ 00111100\ 11000111 \qquad (9)$$

The first 16 bits to the left correspond to the contents of the bit-by-bit counter 201 and comprise four zeros to the left. According to the reverse logic adopted, these four zeros correspond to four units. The next 8 bits, comprising two zeros followed by four ones and two zeros, represent the contents of the register 202, giving the number 60 in the usual forward logic mode.

The last 8 bits to the right include two ones followed by three zeros, then three ones, and represent the contents of the register 203 with the value 227.

In all, these two registers 202 and 203 represent the number 930752, to which we must add the number 4 contained in the bit-by-bit counter 201 to obtain the number 930756 contained in the totality of the register formed by the three registers 201, 202 and 203.

As and when the counter is incremented, the stages of the bit-by-bit counter go successively from 1 to 0 in moving forward from left to right.

In the meantime, the stages of the counters 202 and 203 do not move.

When the last bit, the bit furthest to the right, of the bit-by-bit counter 201 has passed to zero, the total number recorded in the set corresponds to 930768.

Then to increment the entire register by one unit, the bit furthest to the left of the counter 202 is incremented by one bit according to the method of the invention, and then the totality of the contents of the bit-by-bit counter 201 are erased, all these stages being programmed at one.

The maximum number that can be recorded in the register is therefore equal to 65536×16+16, giving 1048576.

When this maximum number has been recorded in the full register, that cell of the two counters 202 and 203 which has been most subjected to action, which is the cell corresponding to the bit furthest to the left of the counter 202, will have been subjected to action only 65536 times, which is within the limits permitted by the present technology for cells of this kind.

Each cell of the bit-by-bit counter 201 too will have been subjected to action 65536 times, since each will have gone from one to zero only once during the cycle in which the cell most subjected to action of the counter 201 will also, for its part, have gone from one to zero or from zero to one.

Figure 3:
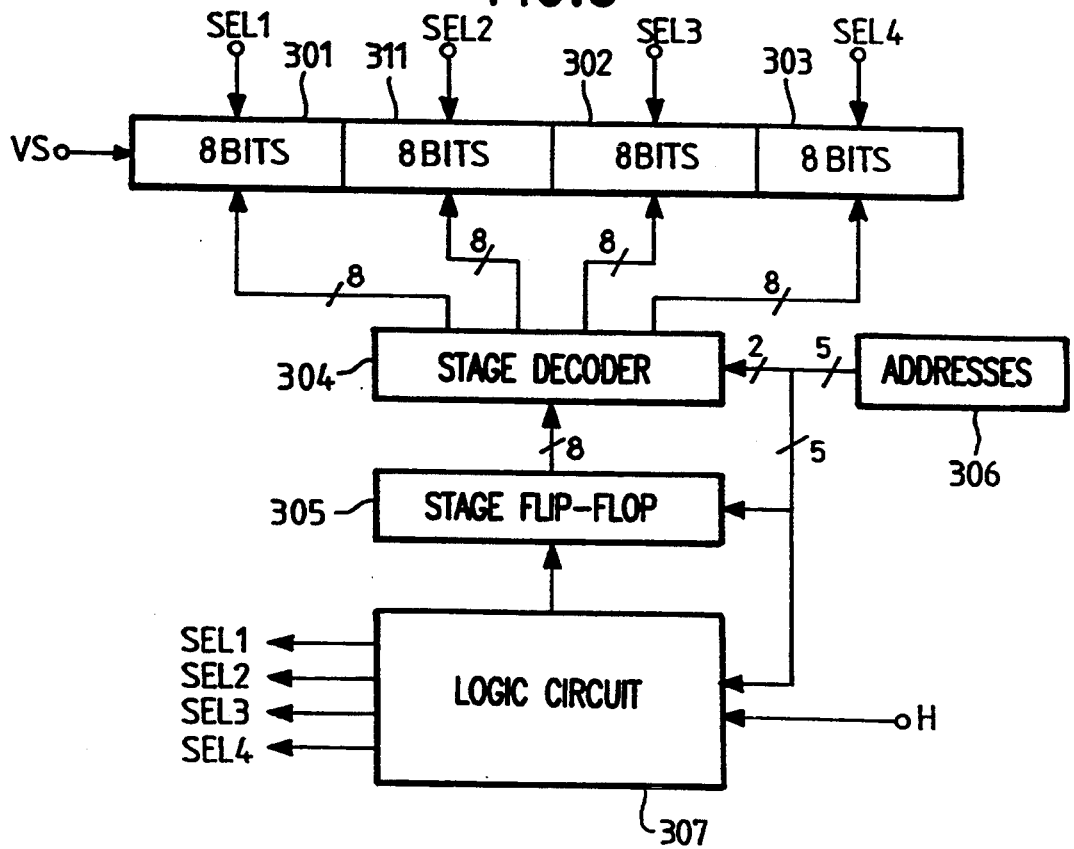
FIG. 3 is a partial diagram of a counter according to the invention.

FIG. 3 shows an exemplary embodiment of the circuits enabling the implementation of the method according to the invention, in a register such as the one shown in FIG. 2. In this example, we have not shown the means that are used to determine the state to be recorded in the counter and that are obtained in a way that is quite within the scope of those skilled in the art, through a logic system such as an appropriately programmed microprocessor.

The complete register therefore comprises two first sub-registers 301 and 311 with eight stages each, corresponding to the bit-by-bit counter 201 of FIG. 2. It also comprises two 8-stage registers 302 and 303, corresponding to the counter 202 and 203 of FIG. 2.

The states registered in the stages of the registers 301, 311, 302 and 303 are memorized in eight stage flip-flops 305 by the data-processing system which determines the final state to be obtained and which has itself read the initial state in the registers.

The state of these flip-flops is transmitted to a stage decoder 304 which sends them to one of the four final registers from an address delivered by an address generator 306. This address generator also controls the flip-flops 305 so as to determine the number of transmissions of the states, as well as a logic circuit 307. This logic circuit 307 is used, under the control of a clock signal H, to select the four registers by means of selection signals SEL1 to SEL4. Besides, the entire set constituted by these registers receives the signal VS, similar to the one determined in FIG. 1, from the logic system for the selection of the final recorded state.

Taking, for example, the case where it is the first counter 202 that is to be incremented, without the second counter 303 being involved, the totality of the registers 301 and 311 being erased, there are, for example, control signals corresponding to the two cycles shown in FIG. 4.

During the first cycle, determined by the clock signal H, the three registers 301, 311 and 302 are selected by the signals SEL1 to SEL3 and are reset at zero by the signal VS. During the second cycle, which too is determined by H, the bits that have to be reset at zero in the register 302 and that have been memorized in the flip-flops 305 are applied by the decoder 304 to this register 302, which is selected by the signal SEL3.

The register 303 undergoes no variation during these two cycles, since its selection signal SEL4 remains constantly at 0.

In short, the method according to the invention makes it possible to increment the contents of a memory register in a secure manner, i.e. without its being necessary to pass again, be it temporarily, through a state of this register which is smaller than the starting state. A particular counting structure enables the use, to this end, of EEPROM type programmable memory elements to enable the recording of very large numbers without exceeding the physical recording limits of a stage of a memory.

What is claimed is:

1. A secure incrementing method, for a binary electronic counter of the EEPROM type, counting in natural binary counting mode and having a set of binary stages enabling the representation of an integer, said secure incrementing method comprising erasing at least one bit of the counter which was previously programmed and wherein, to increment this natural binary counter by one from a first number to a second number greater than the first number,
   a search is firstly made in this first number for a bit that is to be erased due to the incrementing count, this bit is erased, then
   all the bits less significant than this bit are programmed,
   these operations being in an order such that at no instant does the content of the counter represent a number smaller than the first number.

2. A method according to claim 1 wherein, this natural counter comprising at least one register, formed by contiguous stages,
   in a first step, all the stages of this register are forced, so as to represent the maximum number defined by this register, then
   in a second step, the stages of the register whose final value is different from the value defined in the first step are forced to their final value.

3. A method according to claim 1 wherein, this natural counter comprising at least one register formed by contiguous stages, corresponding to a range stretching from least significant values to most significant values,
   in a first step, the stage with the most significant value which has to change its state in going from a lower value to a higher value is forced to the higher value;
   in a second step, the stages with values less significant than that forced at the first step are forced to their definitive value.

4. A method according to any of the claim 1, wherein:
   the binary representation of the number to be represented in the counter is structured in two parts, one part, which corresponds to the least significant numbers to be represented, being organized in the form of a bit-by-bit counter and the other part, which corresponds to the rest of the number to be represented, being organized in the form of a natural binary counter.

5. A method according to claim 4 wherein, to increment this binary counter from a first number to a second number greater than the first number, at least the stages whose contents have to change are forced into their final state, in an order such that at no instant do the contents of the counter represent a number smaller than the first number.

6. A method according to claim 4, wherein the part organized in the form of a natural binary counter enables the counting of a number such that its cell representing the least significant bit is subjected to action for the maximum counting of the entire counter for a number of times equal at most to the physical possibilities of the physical counting cell that is used in the counter.

7. A method according to claim 4 wherein, in the bit-by-bit counter, using EEPROM technology, the bits are programmed one by one.

8. A method according to claim 5, wherein the part organized in the form of a natural binary counter enables the counting of a number such that its cell representing the least significant bit is subjected to action for the maximum counting of the entire counter for a number of times equal at most to the physical possibilities of the physical counting cell that is used in the counter.

9. A secure incrementing method, for a binary electronic counter of the EEPROM type counting in natural binary counting mode and having a set of binary stages enabling the representation of an integer, said secure incrementing method comprising erasing at least one bit of the counter which was previously programmed and wherein, to increment this natural binary counter by any number from a first number to a second number greater than the first number, a search is made of a most significant bit among those which are to be erased in this first number due to the incrementing, this most significant bit is erased, then bits less significant than this most significant bit are programmed, and an erasure of bits within these less significant bits ends the method.

10. A method according to claim 9 wherein, this natural counter comprising at least one register formed by contiguous stages, in a first step, all the stages of this register are forced, so as to represent the maximum number defined by this register, then in a second step, the stages of the register whose final value is different from the value defined in the first step are forced to their final value.

11. A method according to claim 9 wherein, this natural counter comprising at least one register formed by contiguous stages, corresponding to a range stretching from least significant values to most significant values, in a first step, the stage with the most significant value which has to change its state in going from a lower value to a higher value is forced to the higher value;

in a second step, the stages with values less significant than that forced at the first step are forced to their definitive value.

12. A method according to claim 9, or 10, or 11, wherein:

the binary representation of the number to be represented in the counter is structured in two parts, one part, which corresponds to the least significant numbers to be represented, being organized in the form of a bit-by-bit counter and the other part, which corresponds to the rest of the number to be represented, being organized in the form of a natural binary counter.

13. A method according to claim 12 wherein, to increment this binary counter from a first number to a second number greater than the first number, at least the stages whose contents have to change are forced into their final state, in an order such that at no instant do the contents of the counter represent a number smaller than the first number.

14. A method according to claim 12, wherein the part organized in the form of a natural binary counter enables the counting of a number such that its cell representing the least significant bit is subjected to action for the maximum counting of the entire counter for a number of times equal at most to the physical possibilities of the physical counting cell that is used in the counter.

15. A method according to claim 12 wherein, in the bit-by-bit counter, using EEPROM technology, the bits are programmed one by one.

16. A method according to claim 13, wherein the part organized in the form of a natural binary counter enables the counting of a number such that its cell representing the least significant bit is subjected to action for the maximum counting of the entire counter for a number of times equal at most to the physical possibilities of the physical counting cell that is used in the counter.

* * * * *